US012729349B2

(12) United States Patent
Rivera Cruz et al.

(10) Patent No.: US 12,729,349 B2
(45) Date of Patent: Sep. 8, 2026

(54) HOME CARE COMPOSITIONS

(71) Applicant: Colgate-Palmolive Company, New York, NY (US)

(72) Inventors: Luis Javier Rivera Cruz, Mexico City (MX); Jorge Antonio Maldonado Ortega, Delegacion Miguel Hidalgo CP (MX); Aldo Ramirez, Azcapotzalco Ciudad (MX); Marisol Cedomio Armenta, A Cofradia San Miguel III (MX); Claudia Bentosa, Santa Barbara (MX); Mario Alejandro Herrera Lazo De La Vega, Querétaro (MX); Renata Gomez, Mexico City (MX); Sergio Salinas, Querétaro (MX)

(73) Assignee: Colgate-Palmolive Company, New York, NY (US)

( * ) Notice: Subject to any disclaimer, the term of this patent is extended or adjusted under 35 U.S.C. 154(b) by 656 days.

(21) Appl. No.: 17/899,997

(22) Filed: Aug. 31, 2022

(65) Prior Publication Data

US 2023/0074013 A1 Mar. 9, 2023

Related U.S. Application Data

(60) Provisional application No. 63/239,094, filed on Aug. 31, 2021.

(51) Int. Cl.

| | |
|---|---|
| ***C11D 1/00*** | (2006.01) |
| ***C11D 1/83*** | (2006.01) |
| ***C11D 1/90*** | (2006.01) |
| ***C11D 3/04*** | (2006.01) |
| ***C11D 3/37*** | (2006.01) |
| ***C11D 11/00*** | (2006.01) |

(52) U.S. Cl.

CPC .................. *C11D 1/83* (2013.01); *C11D 1/90* (2013.01); *C11D 3/046* (2013.01); *C11D 3/3765* (2013.01); *C11D 11/0094* (2013.01)

(58) Field of Classification Search

None

See application file for complete search history.

(56) References Cited

U.S. PATENT DOCUMENTS

| | | | | |
|---|---|---|---|---|
| 7,169,745 | B2 | 1/2007 | Kasturi et al. | |
| 7,214,650 | B2 | 5/2007 | Kasturi et al. | |
| 8,436,046 | B2 | 5/2013 | Fenyvesi et al. | |
| 9,862,913 | B2 * | 1/2018 | Hardy ...................... | C11D 3/48 |
| 9,969,960 | B2 | 5/2018 | Perez-Garcia et al. | |
| 10,342,746 | B2 | 7/2019 | Joliff et al. | |
| 2014/0336094 | A1 | 11/2014 | Gross | |
| 2018/0265808 | A1 | 9/2018 | Gross | |
| 2020/0377826 | A1 | 12/2020 | Braeckman et al. | |

FOREIGN PATENT DOCUMENTS

| | | |
|---|---|---|
| EP | 2771448 | 9/2014 |
| EP | 3146032 | 3/2017 |
| WO | 2008/074667 | 6/2008 |

OTHER PUBLICATIONS

Journal of the American College of Toxicology, (1983), "Final Report on the Safety Assessment of Sodium Laureth Sulfate and Ammonium Laureth Sulfate," Cosmetic Ingredient Review, vol. 2, No. 5, Mary Ann Liebert, Inc. Publishers, pp. 1-34.

International Search Report and the Written Opinion of the International Searching Authority issued in International Application PCT/US2022/042143 mailed Dec. 23, 2022.

* cited by examiner

*Primary Examiner* — Necholus Ogden, Jr.

(57) ABSTRACT

Described herein are home care compositions (e.g., aqueous liquid compositions), which may be used as a hand dishwashing composition, comprising laureth sulfate having 1 moiety or less of an ethylene oxide group, alkyl aryl sulfonate, a blend of $C_{9-11}$ branched primary alcohols, and an amine oxide or betaine amphoteric surfactant. Methods of making and using these compositions are also described.

17 Claims, No Drawings

HOME CARE COMPOSITIONS

CROSS-REFERENCE TO RELATED APPLICATION

This application claims the benefit of priority from U.S. Provisional Application No. 63/239,094, entitled "Home Care Compositions" and filed Aug. 31, 2021, the contents of which are hereby incorporated herein in their entirety.

BACKGROUND

Providing sustainable products is quickly becoming a significant consumer demand. For example, providing products which utilize less plastic, less water, and/or save space is beneficial for both consumers and the environment.

Aqueous liquid compositions, for example, hand dishwashing compositions, generally need to have certain physicochemical qualities such as, but not limited to, cleaning performance, viscosity, color, odor, and appearance in order to be acceptable to the consumer. Liquid compositions should also have a viscosity behavior which provides pourability and ease of dissolution in water in order to be considered consumer acceptable, particularly in liquid cleaning products like hand dishwashing liquid. For hand dishwashing compositions the dissolution rate of the liquid in water is desired to be rapid so that foam generation is not delayed, since foam is a signal to consumers that the detergent is high quality.

One way to provide for a sustainable product is to offer concentrate compositions which may be diluted by the consumer with simple addition of water. However, aqueous liquid hand dishwashing compositions typically must utilize thickening polymers to provide for appropriate viscosity. Unfortunately, formulation of concentrate compositions with thickening polymers has been elusive due to the high viscosity of the concentrate. Thus, the reconstituted composition exhibits poor physicochemical qualities.

There is a need in the art for aqueous liquid compositions, for example hand dishwashing compositions, which can be formulated as a concentrate and also exhibit beneficial physicochemical qualities upon dilution.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The inventors have discovered that utilization of certain components within an aqueous liquid composition provides for concentrated dishwashing composition capable of providing beneficial physicochemical qualities such as, but not limited to, viscosity, color, odor, and appearance upon dilution to a working concentration. Furthermore, such compositions may be combined with other active ingredients to deliver further physicochemical benefits.

Thus, in one aspect, the invention provides an aqueous liquid composition formed from mixing laureth sulfate having 1 moiety or less of an ethylene oxide group; alkyl aryl sulfonate; caustic soda; a blend of non-ionic $C_{9-11}$ branched primary alcohols; and an amine oxide amphoteric surfactant. In certain embodiments, the alkyl aryl sulfonate is dodecylbenzene sulfonate or a salt thereof. In certain embodiments, the dodecylbenzene sulfonate is sodium dodecylbenzene sulfonate. In certain embodiments, the blend of $C_{9-11}$ branched primary alcohols has a molecular mass of about 488 to about 534 g/mol. In certain embodiments, the amine oxide amphoteric surfactant is selected from lauryl amidopropyl dimethylamine oxide, myristyl amidopropyl dimethylamine oxide, or a mixture of two or more thereof. In certain embodiments, the pH of the composition is neutral. In certain embodiments, the pH of the composition is from about 6.5 to about 7.5. In certain embodiments, the laureth sulfate is sodium laureth sulfate. In certain embodiments, the alkyl aryl sulfonate is present in an amount of from about 9% to about 48% by weight of the composition. In certain embodiments, the laureth sulfate is present in an amount of from about 9% to about 38% by weight of the composition. In certain embodiments, the blend of $C_{9-11}$ branched primary alcohols is present in an amount of from about 1.5% to about 2.2% by weight of the composition. In certain embodiments, the amine oxide amphoteric surfactant is present in an amount of from about 2.5% to about 12% by weight of the composition. In certain embodiments, the ratio of laureth sulfate to the amine oxide amphoteric surfactant is between 2.5:1 to 5:1. In certain embodiments, the composition further comprises an inorganic salt selected from the group consisting of NaCl, $MgSO_4$, $Na_2SO_4$, $CaCl_2$, and a combination thereof. In certain embodiments, the inorganic salt is NaCl. In certain embodiments, the inorganic salt is present in an amount of from about 1% to about 5% by weight of the composition. In certain embodiments, the composition further comprises water. In certain embodiments, the water is present in an amount of from about 20% to about 32% by weight of the composition. In certain embodiments, the composition further comprises a hydrotrope. In certain embodiments, the hydrotrope is present in an amount of from about 0.1% to about 10% by weight of the composition. In certain embodiments, the composition further comprises a chelator. In certain embodiments, the chelator is EDTA. In certain embodiments, the chelator is present in an amount of from about 0.1% to about 1% by weight of the composition. In certain embodiments, the composition appears clear after incubation at 4 °C for 6 hours. In certain embodiments, the composition is free of turbidity after incubation at 4 °C for 6 hours. In certain embodiments, the viscosity is about 400 cP to about 1450 cP as measured on a Brookfield RVT Viscometer using spindle 21 at 20 RPM at 25 °C when diluted with about 3 parts of water. In other embodiments, the invention is directed towards use of an aqueous liquid composition as described herein. In other embodiments, the invention is directed towards a method of making the aqueous liquid composition as described herein, comprising mixing the components at about 28-42 °C.

In other embodiments, the invention is directed towards an aqueous liquid composition formed from mixing laureth sulfate having 1 moiety or less of an ethylene oxide group; a hydrotrope; an ethylene oxide/propylene oxide copolymer; and a betaine amphoteric surfactant. In certain embodiments, the alkyl aryl sulfonate is dodecylbenzene sulfonate or a salt thereof. In certain embodiments, the dodecylbenzene sulfonate is sodium dodecylbenzene sulfonate. In certain embodiments, the blend of $C_{9-11}$ branched primary alcohols has a molecular mass of about 488 to about 534 g/mol. In certain embodiments, the betaine amphoteric surfactant is lauryl amido propyl betaine. In certain embodiments, the pH of the composition is acidic. In certain embodiments, the pH of the composition is from about 2.5 to about 4. In certain embodiments, the laureth sulfate is sodium laureth sulfate. In certain embodiments, the alkyl aryl sulfonate is present in an amount of from about 9% to about 48% by weight of the composition. In certain embodiments, the laureth sulfate is present in an amount of from about 9% to about 38% by weight of the composition. In certain embodiments, the blend of $C_{9-11}$ branched primary alcohols is present in an amount of from about 1% to about 7.5% by weight of the composition. In certain embodiments, the betaine amphoteric surfactant is present in an amount of from about 2.5% to about 12% by weight of the composition. In certain embodiments, the ratio of laureth sulfate to the betaine amphoteric surfactant is between 2.5:1 to 5:1. In certain embodiments, the composition further comprises an inorganic salt selected from the group consisting of NaCl, $MgSO_4$, $Na_2SO_4$, $CaCl_2$, and a combination thereof. In certain embodiments, the inorganic salt is NaCl. In certain embodiments, the inorganic salt is present in an amount of from about 1% to about 7.5% by weight of the composition. In certain embodiments, the composition further comprises NaOH. In certain embodiments, the NaOH is present in an amount of from about 1% to about 5% by weight of the composition. In certain embodiments, the composition further comprises formic acid, citric acid, lactic acid, benzoic acid, salicylic acid, caprylhydroxamic acid, or a combination thereof. In certain embodiments, the citric acid is present in an amount of from about 0.1% to about 5% by weight of the composition. In certain embodiments, the composition further comprises a chelator. In certain embodiments, the chelator is tetrasodium N,N-bis(carboxymethyl)-L-glutamate. In certain embodiments, the chelator is present in an amount of from about 0.1% to about 1% by weight of the composition. In certain embodiments, the viscosity of the composition is about 400 cP to about 17450 cP as measured on a Brookfield RVT Viscometer using spindle 21 at 20 RPM at 25 °C when diluted with about 3 parts of water. In other embodiments, the invention is directed towards use of an aqueous liquid composition as described herein. In other embodiments, the invention is directed towards a method of making the aqueous liquid composition as described herein, comprising mixing the components.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Reference to a molecule, or to molecules, being present at a "wt. %" refers to the amount of that molecule, or molecules, present in the composition based on the total weight of the composition.

According to the present application, use of the term "about" in conjunction with a numeral value refers to a value that may be +/−5% of that numeral. As used herein, the term "substantially free" is intended to mean an amount less than about 5 weight %, less than 3 weight %, 1 wt. %; preferably less than about 0.5 wt. %, and more preferably less than about 0.25 wt. % of the composition.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

The present disclosure is directed towards concentrated aqueous liquid compositions, which may be used as a dishwashing composition upon simple dilution with water. While formulation of concentrate dishwashing compositions have been achieved, formulating stable concentrate dishwashing compositions which provide for adequate physicochemical properties has been challenging. The present invention overcomes such problems.

The aqueous liquid composition of the present invention may be free, or substantially free, of thickening polymers. As used herein, the terms "free of thickening polymers" refers to no thickening polymer being present. As used herein, the terms "substantially free of thickening polymers" refers to a composition that contains thickening polymers in an amount of less than about 5 weight %, less than about 4 weight %, less than about 3 weight %, less than about 2 weight %, less than about 1 weight %, less than about 0.5 weight %, less than about 0.1 weight %, less than about 0.05 weight %, less than about 0.01 weight %, less than about 0.005 weight %, or less than about 0.0001 weight %, based on a total weight of the aqueous liquid composition.

The aqueous liquid composition may be formulated to be free of, substantially free of, or have a limited amount of thickening polymers, such as those selected from polysaccharides; carboxylic acid polymers; crosslinked polyacrylate polymers; polyacrylamide polymers; gums, and combinations of two or more thereof. Examples of polysaccharides that may be present in limited amounts or excluded from the aqueous liquid composition include cellulose, carboxymethyl hydroxyethylcellulose, cellulose acetate propionate carboxylate, hydroxyethylcellulose, hydroxyethyl ethylcellulose, hydroxypropylcellulose, hydroxypropyl methylcellulose, methyl hydroxyethylcellulose, microcrystalline cellulose, sodium cellulose sulfate, and mixtures thereof. Non-limiting examples of carboxylic acid polymers that may be limited or excluded from the aqueous liquid composition include crosslinked carboxylic acid polymers containing one or more monomers derived from acrylic acid, substituted acrylic acids, and salts and esters of these acrylic acids and the substituted acrylic acids, such as carbomers. Non-limiting examples of these gelling agent gums that may be limited or excluded from the aqueous liquid compositions include acacia, agar, algin, alginic acid, ammonium alginate, amylopectin, calcium alginate, calcium carrageenan, carnitine, carrageenan, dextrin, gelatin, gellan gum, guar gum, guar hydroxypropyltrimonium chloride, hectorite, hyaluronic acid, hydrated silica, hydroxypropyl chitosan, hydroxypropyl guar, karaya gum, kelp, locust bean gum, natto gum, potassium alginate, potassium carrageenan, propylene glycol alginate, sclerotium gum, sodium carboxymethyl dextran, sodium carrageenan, tragacanth gum, xanthan gum, and mixtures thereof. In certain cases, the aqueous liquid composition may be formulated to have a limited amount, be substantially free of, or free of synthetic thickening polymers, such as polyvinyl alcohol, sodium polyacrylate, sodium polymethacrylate, polyacrylic acid glycerin ester, carboxyvinyl polymer, polyacrylamide, polyvinyl pyrrolidone, polyvinyl methylether, polyvinyl sulfone, maleic acid copolymer, polyethylene oxide, polydiallyl amine, polyethylene imine, water soluble cellulose derivatives (for example, carboxymethyl cellulose, methyl cellulose, methylhydroxypropyl cellulose, hydroxyethyl cellulose, hydroxypropyl cellulose, cellulose sulfate sodium salt), and/or starch derivatives (for example, starch oxide, dialdehyde starch, dextrin, British gum, acetyl starch, starch phosphate, carboxymethyl starch, hydroxyethyl starch, hydroxypropyl starch).

The aqueous liquid composition of the present invention may be free, or substantially free, of turbidity. As used herein, the terms "free of turbidity" refers to no turbidity being present. As used herein, the terms "substantially free of turbidity" refers to a composition that exhibits turbidity in an amount of less than 30 nephelometric turbidity units (NTU), less than 20 NTU, less than 10 NTU, less than 1 NTU, or less than 0.1 NTU. For example, the aqueous liquid composition may be formulated to have a turbidity from about 0 to about 30 NTU, about 0 to about 25 NTU, about 0 to about 20 NTU, about 0 to about 15 NTU, about 0 to about 10 NTU, about 0 to about 8 NTU, about 0 to about 6 NTU, about 0 to about 5 NTU, about 0 to about 4 NTU, about 0 to about 3 NTU, about 0 to about 2 NTU, about 0 to about 1 NTU, about 0 to about 0.5 NTU, about 0 to about 0.1 NTU; from about 1 to about 30 NTU, about 1 to about 25 NTU, about 1 to about 20 NTU, about 1 to about 15 NTU, about 1 to about 10 NTU, about 1 to about 8 NTU, about 1 to about 6 NTU, about 1 to about 5 NTU, about 1 to about 4 NTU, about 1 to about 3 NTU, about 1 to about 2 NTU; from about 3 to about 30 NTU, about 3 to about 25 NTU, about 3 to about 20 NTU, about 3 to about 15 NTU, about 3 to about 10 NTU, about 3 to about 8 NTU, about 3 to about 6 NTU, about 3 to about 5 NTU; from about 5 to about 30 NTU, about 5 to about 25 NTU, about 5 to about 20 NTU, about 5 to about 15 NTU, about 5 to about 10 NTU, about 5 to about 8 NTU; from about 10 to about 30 NTU, about 3 to about 25 NTU, about 10 to about 20 NTU, about 10 to about 15 NTU; from about 15 to about 30 NTU, about 15 to about 25 NTU, about 15 to about 20 NTU; from about 20 to about 30 NTU, about 20 to about 25 NTU, or any ranges and subranges thereof. In certain embodiments, the aqueous liquid solution, once diluted by about two to about six fold with water, is free, or is substantially free, of turbidity. In certain embodiments, the turbidity is measures at 4 °C. In certain embodiments, the turbidity is measured at 4 °C for about 6 hours. In certain embodiments, the composition appears clear after incubation at 4 °C for about 6 hours. Such characteristics are favorable for consumer products, such as dish washing products.

The aqueous liquid composition of the present invention may be a single phase composition. For example, the composition may be maintained as a single phase, such as a single homogenous phase.

The aqueous liquid composition of the present invention comprises a laureth sulfate having various amount of ethylene oxide group. Laureths, which is the conventional name for ethoxylated forms of lauryl alcohol, are polyethoxyethers of lauryl alcohol that have the general formula $CH_3(CH_2)10CH—(OCH_2—CH_2)nOH$ where "n" is the average number of ethylene oxide (EO) moieties. In certain embodiments, the laureth sulfate has 1 moiety or less of an ethylene oxide group. For instances, the laureth sulfate may have an average number of ethylene oxide of from about 0.1 to about 1, about 0.2 to about 1, about 0.4 to about 1, about 0.6 to about 1, or about 0.8 to about 1. The average number of ethylene oxide of the laureth sulfate may be from about 0.1 to about 0.9, about 0.2 to about 0.9, about 0.4 to about 0.9, about 0.6 to about 0.9; from about 0.1 to about 0.8, about 0.2 to about 0.8, about 0.4 to about 0.8, about 0.6 to about 0.8; about 0.1 to about 0.6, about 0.2 to about 0.6, about 0.4 to about 0.6; from about 0.1 to about 0.4, about 0.2 to about 0.4; from 0.1 to about 0.3 or any ranges or subranges thereof. In other embodiments, the laureth sulfate has more than 1 moiety of an ethylene oxide group. For example, the laureth sulfate may have 2 or 3 moles of ethylene oxide. In some aspects, the selection of EO having various "n" values may require formula adaptations with components having hydrotropic function to match the desired viscosity of the concentrate and diluted products. In some aspects, the laureth sulfate may be in a salt form. In certain embodiments, the laureth salt may be selected from sodium salt, potassium salt, ammonium salt, and combinations thereof. In certain embodiments, the laureth salt is sodium laureth sulfate.

The amount or concentration of the laureth sulfate may vary. The laureth sulfate, or salt thereof, may be present in an amount from about 9.0% to about 38.0% by weight of the composition. For example, the laureth sulfate, or salt thereof, may be present in an amount of about 9 weight %, about 9.5 weight %, about 10 weight %, about 12.5 weight %, about 15 weight %, about 17.5 weight %, about 20 weight %, about 22.5 weight %, about 25 weight %, about 27.5 weight %, about 30 weight %, about 33 weight %, about 36 weight %, about 38 weight %, or any range or subrange formed therefrom, based on the total weight of aqueous liquid composition. In another example, the laureth sulfate, or salt thereof, may be present in an amount of from about 9 to about 25 wt. %, about 9 to about 20 wt. %, about 10 to about 20 wt. %, or about 10 to about 15 wt. %, based on the weight of the aqueous liquid composition. In further embodiments, the laureth sulfate, or salt thereof, may be present in an amount of about 9 wt. % or more, about 10 wt. % or more, about 12 wt. % or more, or about 14 wt. % or more up to about 38 wt. %, based on the weight of the aqueous liquid composition. In further embodiments, the laureth sulfate, or salt thereof, is present in an amount of about 9 to about 35 wt. %, about 9 to about 30 wt. %, about 9 to about 25 wt. %, or about 9 to about 20 wt. %, based on the weight of the composition.

The aqueous liquid composition of the invention includes an alkyl aryl sulfonate. Alkyl aryl sulfonates, sometimes referred to as alkylbenzene sulfonates, are salts of an alkyl-substituted aromatic sulfonic acid. In certain embodiments, the alkyl aryl sulfonate is a linear alkyl aryl sulfonate. In certain embodiments, the alkyl aryl sulfonate is a $C_{8-14}$ linear alkyl aryl sulfonate. In certain embodiments, the alkyl aryl sulfonate is selected from dodecylbenzene sulfonate, tridecyl benzene sulfonate, and combinations thereof. The alkyl aryl sulfonate may be in a salt form. In certain embodiments, the alkyl aryl sulfonate salt is selected from sodium salt, potassium salt, ammonium salt, magnesium salt, and combinations thereof. In certain embodiments, the dodecylbenzene sulfonate is sodium dodecylbenzene sulfonate. In certain embodiments, the tridecyl benzene sulfonate is sodium tridecyl benzene sulfonate.

The amount or concentration of the alkyl aryl sulfonate may vary. The alkyl aryl sulfonate, or salt thereof, may be present in an amount from about 9 to about 48% by weight of the composition. For example, the alkyl aryl sulfonate, or salt thereof, may be present in an amount of about 9 weight %, about 9.5 weight %, about 10 weight %, about 12.5 weight %, about 15 weight %, about 17.5 weight %, about 20 weight %, about 22.5 weight %, about 25 weight %, about 27.5 weight %, about 30 weight %, about 33 weight %, about 36 weight %, about 40 weight %, about 43 weight %, about 48 weight %, or any range or subrange formed therefrom. In another example, the alkyl aryl sulfonate, or salt thereof, may be present in an amount of from about 9 to about 45 wt. %, about 9 to about 40 wt. %, about 10 to about 35 wt. %, about 15 to about 35 wt. %, or about 10 to about 30 wt. %, based on the weight of the aqueous liquid composition. In further embodiments, the alkyl aryl sulfonate, or salt thereof, may be present in an amount of about 9 wt. % or more, about 12.5 wt. % or more, about 15 wt. % or more, or about 20 wt. % or more up to about 45 wt. %, based on the weight of the aqueous liquid composition. In further embodiments, the alkyl aryl sulfonate, or salt thereof, is present in an amount of about 9 to about 48 wt. %, about 9 to about 35 wt. %, about 9 to about 30 wt. %, or about 15 to about 30 wt. %, based on the weight of the composition.

The aqueous liquid composition of the invention includes a blend of $C_{8-11}$ branched primary alcohols. Such primary alcohols may be obtained from natural or synthetic sources. In certain embodiments, the blend of $C_{8-11}$ branched primary alcohols has a molecular mass of about 488 to about 534 g/mol. In certain embodiments, the alcohol blend contains an average of about 7.4 to about 8.5 moles of ethylene oxide per mole of alcohol. In certain embodiments, the alcohol blend contains an average of about 8 moles of ethylene oxide per mole of alcohol. In certain embodiments, the hydroxyl number of the blend is about 105 to about 115 mg KOH/g. In certain embodiments, the acid number of the alcohol blend is about 0.05 to about 0.20 mg KOH/g. In certain embodiments, the alcohol blend has a density of about 0.996 kg/l at 40 °C. In certain embodiments, the blend of $C_{8-11}$ branched primary alcohols are commercially available as Neodol 91 products (Shell, The Netherlands), such as, but not limited to, Neodo™ 91, Neodol™ 91-6, and Neodol™ 91-8, Marlipal 10-8 (sold by Sasol), and may be used individually or in combination.

The aqueous liquid composition of the invention includes a primary alcohol blend. In certain embodiments, the blend comprises $C_{8-11}$ branched primary alcohols. In certain embodiments, the blend comprises $C_{9-11}$ branched primary alcohols. The amount or concentration of the branched primary alcohol blend may vary. The $C_{9-11}$ branched primary alcohol blend may be present in an amount from about 1 to about 7.5 wt. %, by weight of the composition. For example, the $C_{9-11}$ branched primary alcohol blend may be present in an amount of about 1 weight %, about 1.5 weight %, about 2 weight %, about 2.5 weight %, about 3 weight %, about 3.5 weight %, about 4 weight %, about 5 weight %, about 7.5 weight %, or any range or subrange formed therefrom. In another example, the $C_{9-11}$ branched primary alcohol blend may be present in an amount of from about 1 to about 5 wt. %, about 1.5 to about 4.5 wt. %, about 1.5 to about 4 wt. %, or about 2 to about 7.5 wt. %, including any range or subrange thereof, based on the weight of the aqueous liquid composition. In further embodiments, the $C_{9-11}$ branched primary alcohol blend may be present in an amount of about 1 wt. % or more, about 2.5 wt. % or more, or about 4 wt. % or more up to about 7.5 wt. %, based on the weight of the aqueous liquid composition. In further embodiments, the $C_{9-11}$ branched primary alcohol blend is present in an amount of about 1 to about 7.0 wt. %, about 1 to about 6 wt. %, about 1.5 to about 5 wt. %, or about 2 to about 5 wt. %, including any range or subrange thereof, based on the weight of the composition.

The aqueous liquid composition of the invention may include an amine oxide amphoteric surfactant. The amine oxide amphoteric surfactant may comprise an alkyl dimethyl amine oxide surfactant in which the alkyl group typically has from 8 to 18 carbon atoms. The amine oxide amphoteric surfactant may have a structuring according to the following formula: $R_2R_2R_3N^+O^-$, wherein $R_1$ comprises 8 to 18 carbon atoms and $R_2$ and $R_3$ each contain 1-4 carbon atoms. $R_2$ and $R_3$ each preferably contain 1 or 2 carbon atoms. For instance, both $R_2$ and $R_3$ may be methyl. In some embodiments, $R_1$ is selected form alkyl groups with 8 to 18 carbon atoms, in particular 10 to 16 carbon atoms, more in particular 10 to 14 carbon atoms. The amine oxide amphoteric surfactant may be selected from $C_8$-$C_{18}$ dimethyl amine oxides, in particular $C_{10-16}$ dimethyl amine oxides, more in particular $C_{10}$-$C_{14}$ dimethyl amine oxides. $C_{10}$ (decyl) and $C_{12}$ (dodecyl or lauryl)dimethyl amine oxides show may provide particularly good results when incorporated into certain embodiments of the aqueous liquid composition. Coco-dimethyl amine oxide, which is a mixture of $C_{10}$-$C_{18}$ dimethyl amine oxides may also be useful.

In certain embodiments, the amine oxide amphoteric surfactant is $C_{12-14}$ alkyl amidopropyl dimethylamine oxide. In certain embodiments, the amine oxide amphoteric surfactant is selected from a $C_{12}$ alkyl amidopropyl dimethylamine oxide, a $C_{14}$ alkyl amidopropyl dimethylamine oxide, and a mixture thereof. The alkyl dimethyl amine oxide may be chosen from lauryl dimethyl amine oxide, myristyl dimethyl amine oxide or a mixture thereof. In certain embodiments, the amine oxide amphoteric surfactant is selected from lauryl amidopropyl dimethylamine oxide, myristyl amidopropyl dimethylamine oxide, and a mixture thereof. In certain embodiments, the amine oxide amphoteric surfactant has a density of about 0.99 g/ml. In certain embodiments, the amine oxide amphoteric surfactant has a viscosity of about 45 cps at 25 °C. In certain embodiments, the amine oxide amphoteric surfactant is commercially available as Ammonyx® LMDO (Stepan Co., Il., USA).

The amount or concentration of the amine oxide amphoteric surfactant may vary. The amine oxide amphoteric surfactant may be present in an amount from about 2 to about 15 wt. % by weight of the composition. For example, the amine oxide amphoteric surfactant may be present in an amount of about 2 weight %, about 2.5 weight %, about 3 weight %, about 3.5 weight %, about 4 weight %, about 4.5 weight %, about 5 weight %, about 5.5 weight %, about 6 weight %, about 6.5 weight %, about 7 weight %, about 7.5 weight %, about 8 weight %, about 8.5 weight %, about 10 weight %, about 11 weight %, about 12.5 weight %, about 13.5 weight %, about 15 weight %, or any range or subrange formed therefrom, based on the total weight of the aqueous liquid composition. In another example, the amine oxide amphoteric surfactant may be present in an amount from about 2 to about 14 wt. %, about 2 to about 12.5 wt. %, about 2.5 to about 12 wt. %, or about 4 to about 10 wt. %, based on the weight of the aqueous liquid composition. In further embodiments, the amine oxide amphoteric surfactant may be present in an amount of about 2 wt. % or more, 3 wt. % or more, about 4 wt. % or more, or about 5 wt. % or more up to about 12 wt. %, optionally up to about 10 wt. %, up to about 9 wt. %, up to about 8 wt. %, up to about 7 wt. %, up to about 6 wt. %, up to about 5 wt. %, or up to 4 wt. %, based on the weight of the aqueous liquid composition. In further embodiments, the amine oxide amphoteric surfactant is present in an amount of about 2 to about 13 wt. %, about 2.5 to about 12.5 wt. %, about 3 to about 12 wt. %, or about 4 to about 11 wt. %, including any range or subrange thereof, based on the weight of the aqueous liquid composition.

The aqueous liquid composition of the invention may include a betaine amphoteric surfactant. In certain embodiments, the betaine amphoteric surfactant is selected from cocamidopropyl betaine (CAPB), lauryl amido propyl betaine, lauryl amino betaine acetate, and a mixture of two or more thereof. The amount or concentration of the betaine amphoteric surfactant may vary. The betaine amphoteric surfactant may be present in an amount from about 2 to about 15 wt. % by weight of the aqueous liquid composition. For example, the betaine amphoteric surfactant may be present in an amount of about 2 weight %, about 2.5 weight %, about 3 weight %, about 3.5 weight %, about 4 weight %, about 5 weight %, about 7 weight %, about 9.5 weight %, about 11 weight %, about 13 weight %, about 15 weight %, or any range or subrange formed therefrom, based on the total weight of the aqueous liquid composition. In another example, the betaine amphoteric surfactant may be present in an amount of from about 2 to about 14.5 wt. %, about 2.5 to about 14.5 wt. %, about 2.5 to about 13 wt. %, or about 2.5 to about 12 wt. %, based on the weight of the aqueous liquid composition. In further embodiments, the betaine amphoteric surfactant may be present in an amount of about 2 wt. % or more, about 2.5 wt. % or more, or about 3 wt. % or more up to about 12.5 wt. %, optionally up to about 10 wt. %, up to about 9 wt. %, up to about 8 wt. %, up to about 7 wt. %, up to about 6 wt. %, up to about 5 wt. %, or up to 4 wt. %, based on the weight of the aqueous liquid composition. In further embodiments, the betaine amphoteric surfactant is present in an amount of about 2 to about 13 wt. %, about 2.5 to about 12.5 wt. %, about 3 to about 12.0 wt. %, or about 4 to about 11 wt. %, based on the weight of the aqueous liquid composition.

The aqueous liquid composition of the invention may include one or more inorganic salts. In certain embodiments, the inorganic salt is selected from a sulfate, citrate, chloride, nitrate, and a combination thereof. In certain embodiments, the inorganic salt is selected from NaCl, $MgSO_4$, $Na_2SO_4$, $CaCl_2$, and a combination thereof. In certain embodiments, the inorganic salt is NaCl. The amount or concentration of the one or more salts may vary. The one or more inorganic salts may be present in an amount from about 1 to about 6 wt. %, from about 2 to about 5.5 wt. %, or from about 2 to about 5 wt. %, by weight of the aqueous liquid composition. Use of larger salt concentrations results in compositions having creamy structure with high viscosity values, which makes use of the aqueous liquid composition untenable. In certain aspects, the aqueous liquid composition of the invention may include various known salts and surfactant blends. The final salt concentration may be evaluated and adapted according to the desired targets of viscosity.

The aqueous liquid composition of the invention may further include sodium hydroxide (NaOH). The amount or concentration of the sodium hydroxide may vary. The sodium hydroxide may be present in an amount from about 1 to about 6 wt. %, from about 1.5 to about 4.5 wt. %, or from about 2 to about 4 wt. %, by total weight of the aqueous liquid composition.

The aqueous liquid composition of the invention may further include a hydrotrope. The hydrotrope may be selected from weak organic acids. Although the organic acid may act as a hydrotrope, in certain embodiments, the aqueous liquid composition may include a weak organic acid that does not act as a hydrotrope. Hydrotropes are compounds that solubilize hydrophobic compounds in aqueous solutions. In certain embodiments, the weak organic acid is selected from formic acid, citric acid, lactic acid, benzoic acid, salicylic acid, caprylhydroxamic acid, and a combinations of two or more thereof. In certain embodiments, the weak organic acid is citric acid. The amount or concentration of the weak organic acid may vary. The weak organic acid may be present in an amount from about 0.1 to about 10 wt. %, from about 0.1 to about 5 wt. %, from about 0.1 to about 3 wt. %, or from about 0.2 to about 0.8 wt. %, by weight of the aqueous liquid composition.

The aqueous liquid composition may be formulated to have a pH from about 2.5 to about 8. For example, the aqueous liquid composition may be from about 2.5 to about 8, about 2.5 to about 7, about 2.5 to about 6, about 2.5 to about 5, about 2.5 to about 4; from about 3 to about 8, about 3 to about 7, about 3 to about 6, about 3 to about 5, about 3 to about 4; from about 4 to about 8, about 4 to about 7, about 4 to about 6, about 4 to about 5; from about 4.5 to about 8, about 4.5 to about 7, about 4.5 to about 6; about 5 to about 8, about 5 to about 7, about 5 to about 6; from about 5.5 to about 8, about 5.5 to about 7, about 5.5 to about 6; from about 6 to about 8, about 6 to about 7; from about 6.5 to about 8, about 7 to about 8, or any range or subrange thereof. In certain embodiments, the aqueous liquid composition has an acidic pH. For example, the aqueous liquid composition may have a pH from about 2.5 to about 6.8, from about 2.5 to about 5.5, from about 2.5 to about 4.0, or from about 2.5 to about 3.5. In certain embodiments, the aqueous liquid composition has a neutral pH. For example, the aqueous liquid composition may have a pH from about 6.0 to about 8.0, from about 6.5 to about 7.5, from about 6.8 to about 7.2, from about 6.9 to about 7.1, or about 7.0. In certain embodiments, the aqueous liquid composition has a pH between about 6 to about 8 and the weak organic acid may be present in an amount from about 0.1 to about 1 wt. %, based on the total weight of the aqueous liquid composition. In certain embodiments, the aqueous liquid composition has a pH between about 5 to about 6 and the weak organic acid may be present in an amount from about 0.1 to about 6.5 wt. %, based on the total weight of the aqueous liquid composition.

The aqueous liquid composition may include caustic soda. The amount of caustic soda in the aqueous liquid composition may be from about 5 to about 11 wt. %, based on the on the total weight of the aqueous liquid composition. For instance, the aqueous liquid composition may include from about 5 to about 10 wt. %, about 5 to about 9 wt. %, about 5 to about 8 wt. %, about 5 to about 7 wt. %; from about 6 to about 11 wt. %, about 6 to about 10 wt. %, about 6 to about 9 wt. %, about 6 to about 8 wt. %; from about 7 to about 11 wt. %, about 7 to about 10 wt. %, about 7 to about 9 wt. %; from about 8 to about 11 wt. %, about 8 to about 10 wt. %; from about 9 to about 11 wt. %, or any range or subrange thereof, based on the total weight of the aqueous liquid composition.

The aqueous liquid composition of the invention may further include non-ionic surfactant prepared by reacting ethylene oxide (EO) and propylene oxide (PO) in combination with an alcohol. In certain embodiments, such EO/PO block copolymer containing non-ionic surfactants are referred to as poloxamer. Examples of suitable nonionic surfactants include poloxamers (sold under trade name PLURONIC™). The amount or concentration of the EO/PO block copolymer non-ionic surfactant may vary. The EO/PO block copolymer non-ionic surfactant may be present in an amount from about 0.1 to about 1 wt. %, from about 0.1 to about 0.8 wt. %, or from about 0.2 to about 0.5 wt. %, by total weight of the aqueous liquid composition.

The aqueous liquid composition of the invention may further include a chelating agent. The chelating agent is safe for human exposure. In certain embodiments, the chelating agent is selected from ethylenediaminetetraacetic acid (EDTA), tetrasodium N,N-bis(carboxymethyl)-L-glutamate (GLDA), sodium iminodisuccinate (IDSNa), diethylene triamine pentaacetic acid (DTPA), 1-hydroxyethane 1,1-diphosphonic acid (HEDP), and combinations thereof. The chelating agent may be present in an amount from about 0.1 to about 1 wt. %, from about 0.1 to about 0.8 wt. %, or from about 0.2 to about 0.6 wt. %, by total weight of the aqueous liquid composition.

In certain embodiments, the amine oxide amphoteric surfactant is utilized for compositions having neutral pH. In certain embodiments, the betaine amphoteric surfactant is utilized for compositions having acidic pH.

The viscosity of the aqueous liquid composition may vary. Unless indicated otherwise, viscosity is measured on a Brookfield RVT Viscometer using spindle 21 at 25 °C, and at a variable RPM speed to have a torque between 10% and 90%. In preferred embodiments, the torque is equal about 50%. For example, for compositions having viscosity below about 2,500 cP, 20 rpm may be used. For compositions having viscosity at about 30,000 cP, 5 RPM may be used. In some embodiments, the aqueous liquid composition of the present invention may have a viscosity of about 1000 cP to about 30,000 cP or about 1150 cP to about 27,000 cP, at about 25 °C. In certain embodiments, the viscosity is about 1050 cP to about 15,000 cP.

The weight ratio of anionic surfactants to amine oxide may vary. In certain embodiments, the weight ratio of laureth sulfate surfactant and alkyl aryl sulfonate to the amine oxide is between about 8:1 to about 19:1. For example, the aqueous liquid composition may be formulated to have a weight ratio of the total amount of laureth sulfate surfactant and alkyl aryl sulfonate to the total amount of amine oxide of from about 8:1 to about 19:1, about 8:1 to about 18:1, about 8:1 to about 16:1, about 8:1 to about 14:1; from about 9:1 to about 19:1, about 9:1 to about 18:1, about 9:1 to about 16:1, about 9:1 to about 14:1; from about 10:1 to about 19:1, about 10:1 to about 18:1, about 10:1 to about 16:1, about 10:1 to about 14:1; from about 11:1 to about 19:1, about 11:1 to about 18:1, about 11:1 to about 16:1, about 11:1 to about 14:1; from about 12:1 to about 19:1, about 12:1 to about 18:1, about 12:1 to about 16:1, about 12:1 to about 14:1, or any range or subrange thereof. In certain embodiments, the weight ratio of anionic surfactants laureth sulfate and alkyl aryl sulfonate to the amine oxide amphoteric surfactant is between about 10:1 to about 17:1. In certain embodiments, the weight ratio of anionic surfactants laureth sulfate and alkyl aryl sulfonate to the amine oxide amphoteric surfactant is between about 12:1 to about 15:1. In certain embodiments, the weight ratio of anionic surfactants laureth sulfate and alkyl aryl sulfonate to the amine oxide amphoteric surfactant is about 13:1.

Additionally or alternatively, the weight ratio of laureth sulfate surfactant to the amine oxide surfactant is between about 2.5:1 to about 5:1. For example, the aqueous liquid composition may be formulated to have a weight ratio of laureth sulfate surfactant to the amine oxide surfactant from about 2.5:1 to about 5:1, about 2.5:1 to about 4:1, about 2.5:1 to about 3:1; from about 3:1 to about 5:1, about 3:1 to about 4:1; from about 3.5:1 to about 5:1, about 3.5:1 to about 4:1; from about 4:1 to about 5:1, or any ranges and subranges thereof, based on the total weight of the aqueous liquid composition. In certain embodiments, the weight ratio of laureth sulfate surfactant to the amine oxide surfactant is between about 3.0:1 to about 4.5:1. In certain embodiments, the weight ratio of laureth sulfate surfactant to the amine oxide surfactant is between about 3.0:1 to about 4.0:1. In certain embodiments, the weight ratio of laureth sulfate surfactant to the amine oxide surfactant is about 3.5:1.

The weight ratio of anionic surfactants to betaine amphoteric surfactant may vary. In certain embodiments, the weight ratio of the total amount of laureth sulfate surfactant and alkyl aryl sulfonate to the total amount of betaine amphoteric surfactant is between about 8:1 to about 19:1. For example, the aqueous liquid composition may be formulated to have a weight ratio of the total amount of laureth sulfate surfactant and alkyl aryl sulfonate to the total amount of betaine amphoteric surfactant of from about 8:1 to about 19:1, about 8:1 to about 18:1, about 8:1 to about 16:1, about 8:1 to about 14:1; from about 9:1 to about 19:1, about 9:1 to about 18:1, about 9:1 to about 16:1, about 9:1 to about 14:1; from about 10:1 to about 19:1, about 10:1 to about 18:1, about 10:1 to about 16:1, about 10:1 to about 14:1; from about 11:1 to about 19:1, about 11:1 to about 18:1, about 11:1 to about 16:1, about 11:1 to about 14:1; from about 12:1 to about 19:1, about 12:1 to about 18:1, about 12:1 to about 16:1, about 12:1 to about 14:1, or any range or subrange thereof. In certain embodiments, the weight ratio of anionic surfactants laureth sulfate and alkyl aryl sulfonate to the betaine amphoteric surfactant is between about 10:1 to about 17:1. In certain embodiments, the weight ratio of anionic surfactants laureth sulfate and alkyl aryl sulfonate to the betaine amphoteric surfactant is between about 12:1 to about 15:1. In certain embodiments, the weight ratio of anionic surfactants laureth sulfate and alkyl aryl sulfonate to the betaine amphoteric surfactant is about 13:1.

In certain embodiments, the weight ratio of laureth sulfate surfactant to the betaine surfactant is between about 2.5:1 to about 5:1. In certain embodiments, the weight ratio of laureth sulfate surfactant to the betaine surfactant is between about 3.0:1 to about 4.5:1. In certain embodiments, the weight ratio of laureth sulfate surfactant to the betaine surfactant is between about 3.0:1 to about 4.0:1. In certain embodiments, the weight ratio of laureth sulfate surfactant to the betaine surfactant is about 3.5:1.

Additional optional ingredients may be included to provide added effect or to make the product more attractive.

Such ingredients include, but are not limited to, perfumes, fragrances, colorants, pigments, dyes, abrasive agents, disinfectants, radical scavengers, bleaches, chelating agents, antibacterial agents/preservatives, optical brighteners, hydrotropes, or combinations thereof.

The aqueous liquid composition can be provided in any type and shape of container that is compatible with the aqueous liquid composition. Non-limiting examples of containers are made from plastic or glass. For consumer convenience, a non-rigid container or container having flexibility is used. In preferred embodiments, plastic may be chosen. The plastic can be any type of plastic. Examples of plastic include, but are not limited to, polyethylene tetra phthalate (PET), polyethylene, polypropylene, or polyvinyl chloride. Container properties, such as clarity, gloss, color, and shape can be selected to provide a desired aesthetic effect.

The present invention further includes methods of using the aqueous liquid compositions as described herein. In certain embodiments, the use comprises mixing a composition as described herein with water to dilute the composition and a washing hard surface with the diluted mixture. In certain embodiments, the composition is diluted with water. In certain embodiments, the hard surface is a dish, kitchenware, or household surface. In certain non-limiting embodiments, the composition is diluted about 1:3 with water for dish washing applications. In certain non-limiting embodiments, the composition is diluted about 1:15 with water for dish spraying application. In certain non-limiting embodiments, the composition is diluted about 1:30 with water to obtain a multipurpose spray. In certain non-limiting embodiments, the composition is diluted about 1:60 with water to obtain a glass/window spray.

The present invention further includes methods of making the aqueous liquid compositions as described herein. In certain embodiments, the method comprises adding the components of the aqueous liquid composition as described herein and mixing the composition to obtain a uniform mixture. The aqueous liquid compositions can be made by simple mixing methods from readily available components which, on storage, do not adversely affect the entire aqueous liquid composition. Mixing can be done by any mixer that forms the aqueous liquid composition. Examples of mixers include, but are not limited to, static mixers and in-line mixers. In certain embodiments, the mixing step may be performed at room temperature. In certain embodiments, the mixing step may be performed at a temperature between about 30 °C to about 60 °C. In certain embodiments, the method comprises mixing together water and betaine or amine oxide, followed by mixing salt, then hydrotrope, then other ingredients, and followed by mixing with SLES. In some embodiments, pH may be adjusted using caustic soda or citric acid.

In certain non-limiting embodiments, the aqueous liquid composition may comprise a formulation as specified in the table below.

TABLE 1a

An Exemplary Aqueous Liquid Composition for acidic pH

| Component | Wt. % |
|---|---|
| Water | q.s. |
| Sodium Laureth Sulfate 1EO (SLES) | 40-50 |
| Betaine Amphoteric Surfactant | 2.5-12.0 |
| EO/PO copolymer | 0.2-0.5 |
| Salt | 2.5 to 3.5 |
| Organic acid | 0.1 to 1.0 |
| Chelating Agent | 0.1 to 1.0 |
| Misc. (Incl. coloring, perfume, antimicrobial) | 0.05 to 2.0 |
| Total Components | 100.000 |

TABLE 1b

An Exemplary Aqueous Liquid Composition for neutral pH

| Component | Wt. % |
|---|---|
| Water | q.s. |
| Sodium Laureth Sulfate 1EO (SLES) | 9.0 to 38.0 |
| Alkyl Aryl Sulfonate | 35.0 to 45.0 |
| Amine Oxide Amphoteric Surfactant | 2.5 to 12.0 |
| $C_{9-11}$ Alcohol | 1.5 to 2.0 |
| Salt | 2.5 to 5.5 |
| Chelating Agent | 0.1 to 1.0 |
| Misc. (Inl. coloring, perfume, antimicrobial) | 0.05 to 2.0 |
| Total Components | 100.000 |

Non-limiting embodiments of the personal care composition are described below.

In a first embodiment, provided is an aqueous liquid composition formed from mixing:

a laureth sulfate having 1 moiety or less of an ethylene oxide group;

an alkyl aryl sulfonate;

caustic soda;

a blend of non-ionic $C_{9-11}$ branched primary alcohols; and an amine oxide amphoteric surfactant.

According to a second embodiment, the aqueous liquid composition of the first embodiment, wherein the alkyl aryl sulfonate is dodecylbenzene sulfonate or a salt thereof.

According to a third embodiment, the aqueous liquid composition of the second embodiment, wherein the dodecylbenzene sulfonate is sodium dodecylbenzene sulfonate.

According to a fourth embodiment, the aqueous liquid composition of any preceding embodiment, wherein the blend of C9-11 branched primary alcohols has a molecular mass of about 488 to about 534 g/mol.

According to a fifth embodiment, the aqueous liquid composition of any preceding embodiment, wherein the amine oxide amphoteric surfactant is selected from lauryl amidopropyl dimethylamine oxide, myristyl amidopropyl dimethylamine oxide, or a mixture thereof.

According to a sixth embodiment, the aqueous liquid composition of any preceding embodiment, wherein the pH of the composition is neutral.

According to a seventh embodiment, the aqueous liquid composition of any preceding embodiment, wherein the pH of the composition is from about 6.5 to about 7.5.

According to an eighth embodiment, the aqueous liquid composition of any preceding embodiment, wherein the laureth sulfate is sodium laureth sulfate.

According to a ninth embodiment, the aqueous liquid composition of any preceding embodiment, wherein the alkyl aryl sulfonate is present in an amount of from about 9.0% to about 48.0% by weight of the composition.

According to a tenth embodiment, the aqueous liquid composition of any preceding embodiment, wherein the laureth sulfate is present in an amount of from about 9.0% to about 38.0% by weight of the composition.

According to an eleventh embodiment, the aqueous liquid composition of any preceding embodiment, wherein the blend of $C_{9-11}$ branched primary alcohols is present in an amount of from about 1.5% to about 2.2% by weight of the composition.

According to a twelfth embodiment, the aqueous liquid composition of any preceding embodiment, wherein the amine oxide amphoteric surfactant is present in an amount of from about 2.5% to about 12.0% by weight of the composition.

According to a thirteenth embodiment, the aqueous liquid composition of any preceding embodiment, wherein the ratio of laureth sulfate to the amine oxide amphoteric surfactant is between 2.5:1 to 5:1.

According to a fourteenth embodiment, the aqueous liquid composition of any preceding embodiment, further comprising an inorganic salt selected from the group consisting of NaCl, $MgSO_4$, $Na_2SO_4$, $CaCl_2$, and a combination thereof.

According to a fifteenth embodiment, the aqueous liquid composition of the fourteenth embodiment, wherein the inorganic salt is NaCl.

According to a sixteenth embodiment, the aqueous liquid composition of the fourteenth or fifteenth embodiment, wherein the inorganic salt is present in an amount of from about 1.0% to about 5.0% by weight of the composition.

According to a seventeenth embodiment, the aqueous liquid composition of any preceding embodiment, further comprising water.

According to an eighteenth embodiment, the aqueous liquid composition of the seventeenth embodiment, wherein the water is present in an amount of from about 20.0% to about 32.0% by weight of the composition.

According to a nineteenth embodiment, the aqueous liquid composition of any preceding embodiment, further comprising hydrotrope.

According to a twentieth embodiment, the aqueous liquid composition of the nineteenth embodiment, wherein the hydrotrope is present in an amount of from about 0.1% to about 10.0% by weight of the composition.

According to a twenty-first embodiment, the aqueous liquid composition of any preceding embodiment, further comprising a chelator.

According to a twenty-second embodiment, the aqueous liquid composition of the twenty-first embodiment, wherein the chelator is EDTA.

According to a twenty-third embodiment, the aqueous liquid composition of the twenty-first embodiment or the twenty-second embodiment, wherein the chelator is present in an amount of from about 0.1% to about 1.0% by weight of the composition.

According to a twenty-forth embodiment, the aqueous liquid composition of any preceding embodiment, wherein the composition appears clear after incubation at 4 °C for 6 hours.

According to a twenty-fifth embodiment, the aqueous liquid composition of any preceding embodiment, wherein the composition is free of turbidity after incubation at 4 °C for 6 hours.

According to a twenty-sixth embodiment, the aqueous liquid composition of any preceding embodiment, wherein the viscosity is about 400 cP to about 1450 cP as measured on a Brookfield RVT Viscometer using spindle 21 at 20 RPM at 25 °C when diluted with about 3 parts of water.

According to a twenty-seventh embodiment, provided is the use of an aqueous liquid composition of any preceding embodiment.

According to a twenty-eighth embodiment, provided is a method of making the aqueous liquid composition of any one of the first embodiment to the twenty-fifth embodiment, comprising mixing the components at about 28-42 °C.

According to a twenty-ninth embodiment, provided is an aqueous liquid composition formed from mixing:

laureth sulfate having 1 moiety or less of an ethylene oxide group;

a hydrotrope;

an ethylene oxide/propylene oxide copolymer; and a betaine amphoteric surfactant.

According to a thirtieth embodiment, the aqueous liquid composition of the twenty-ninth embodiment, wherein the betaine amphoteric surfactant is lauryl amido propyl betaine.

According to a thirty-first embodiment, the aqueous liquid composition of the twenty-ninth or thirtieth embodiment, wherein the pH of the composition is acidic.

According to a thirty-second embodiment, the aqueous liquid composition of any one of the twenty-ninth to thirty-first embodiments, wherein the pH of the composition is from about 2.5 to about 4.0.

According to a thirty-third embodiment, the aqueous liquid composition of any one of twenty-ninth to thirty-second embodiments, wherein the laureth sulfate is sodium laureth sulfate.

According to a thirty-forth embodiment, the aqueous liquid composition of any one of twenty-ninth to thirty-third embodiments, wherein the laureth sulfate is present in an amount of from about 9.0% to about 38.0% by weight of the composition.

According to a thirty-fifth embodiment, the aqueous liquid composition of any one of twenty-ninth to thirty-forth embodiments, wherein the betaine amphoteric surfactant is present in an amount of from about 2.5% to about 12.0% by weight of the composition.

According to a thirty-sixth embodiment, the aqueous liquid composition of any one of twenty-ninth to thirty-fifth embodiments, wherein the ratio of laureth sulfate to the betaine amphoteric surfactant is from about 2.5:1 to about 5:1.

According to a thirty-seventh embodiment, the aqueous liquid composition of any one of the twenty-ninth to thirty-sixth embodiments, further comprising an inorganic salt selected from the group consisting of NaCl, $MgSO_4$, $Na_2SO_4$, $CaCl_2$, and a combination thereof.

According to a thirty-eight embodiment, the aqueous liquid composition of thirty-seventh embodiment, wherein the inorganic salt is NaCl.

According to a thirty-ninth embodiment, the aqueous liquid composition of the thirty-seventh or thirty-eighth embodiment, wherein the inorganic salt is present in an amount of from about 1.0% to about 7.5% by weight of the composition.

According to a fortieth embodiment, the aqueous liquid composition of any one of the twenty-ninth to thirty-ninth embodiments, further comprising NaOH.

According to a forty-first embodiment, the aqueous liquid composition of the fortieth embodiment, wherein the NaOH is present in an amount of from about 1% to about 5.0% by weight of the composition.

According to a forty-second embodiment, the aqueous liquid composition according to any one of the twenty-ninth to forty-first embodiments, further comprising formic acid, citric acid, lactic acid, benzoic acid, salicylic acid, capryl hydroxamic acid, or a combination thereof.

According to a forty-third embodiment, the aqueous liquid composition of the forty-second embodiment, wherein the citric acid is present in an amount of from about 0.1% to about 5.0% by weight of the composition.

According to a forty-forth embodiment, the aqueous liquid composition of any one of the twenty-ninth to forty-third embodiments, further comprising a chelator.

According to a forty-fifth, the aqueous liquid composition of the forty-forth embodiment, wherein the chelator is tetrasodium N,N-bis(carboxymethyl)-L-glutamate.

According to a forty-sixth embodiment, the aqueous liquid composition according to the forty-forth or forty-fifth embodiment, wherein the chelator is present in an amount of from about 0.1% to about 1.0% by weight of the composition.

According to a forty-seventh embodiment, the aqueous liquid composition according to any one of the twenty-ninth to forty-sixth embodiments, wherein the viscosity of the composition is about 400 cP to about 17450 cP as measured on a Brookfield RVT Viscometer using spindle 21 at 20 RPM at 25 °C when diluted with about 3 parts of water.

According to a forty-eighth embodiment, provided is the use of an aqueous liquid composition according to any one of the twenty-ninth to forty-seventh embodiments.

According to a forty-ninth embodiment, provided is a method of making the aqueous liquid composition according to any one of the twenty-ninth to forty-seventh embodiments: comprising mixing the components.

According to a fiftieth embodiment, provided is a home care composition comprising:

an ethoxylated sulfate having 1 moiety or less of an ethylene oxide group;

an alkyl sulfonate;

optionally caustic soda;

a blend of non-ionic $C_{9-11}$ branched primary alcohols; and an amphoteric surfactant comprising an amine oxide.

According to a fifty-first embodiment, the home care composition according to fiftieth embodiment, wherein the ethoxylated sulfate is a laureth sulfate.

According to a fifty-second embodiment, the home care composition according to the fiftieth or fifty-first embodiment, wherein the alkyl aryl sulfonate is dodecylbenzene sulfonate or a salt thereof.

According to a fifty-third embodiment, the home care composition according to any one of the fiftieth to fifty-second embodiments, wherein the dodecylbenzene sulfonate is sodium dodecylbenzene sulfonate.

According to a fifty-forth embodiment, the home care composition according to any one of the fiftieth to fifty-third embodiments, wherein the blend of $C_{9-11}$ branched primary alcohols has a molecular mass of about 488 to about 534 g/mol.

According to a fifty-fifth embodiment, the home care composition according to any one of the fiftieth to fifty-forth embodiments, wherein the amine oxide is selected from lauryl amidopropyl dimethylamine oxide, myristyl amidopropyl dimethylamine oxide, or a mixture thereof.

According to a fifty-sixth embodiment, the home care composition according to any one of the fiftieth to fifty-fifth embodiments, wherein the pH of the composition is from about 6.5 to about 7.5.

According to a fifty-seventh embodiment, the home care composition according to any one of the fiftieth to fifty-sixth embodiments, wherein the pH of the composition is neutral.

According to a fifty-eighth embodiment, the home care composition according to any one of the fifty-first to fifty-seventh embodiments, wherein the laureth sulfate is sodium laureth sulfate.

According to a fifty-ninth embodiment, the home care composition according to any one of the fiftieth to fifty-eight embodiments, wherein the alkyl sulfonate is an alkyl aryl sulfonate and is present in an amount of from about 9% to about 48% by weight of the composition.

According to a sixtieth embodiment, the home care composition according to any one of the fifty-first to fifty-ninth embodiments, wherein the laureth sulfate is present in an amount of from about 9.0% to about 38.0% by weight of the composition.

According to a sixty-first embodiment, the home care composition according to any one of the fiftieth to sixtieth embodiments, wherein the blend of $C_{9-11}$ branched primary alcohols is present in an amount of from about 1.5% to about 2.2% by weight of the composition.

According to a sixty-second embodiment, the home care composition according to any one of the fiftieth to sixty-first embodiments, wherein the amine oxide is present in an amount of from about 2.5% to about 12.0% by weight of the composition.

According to a sixty-third embodiment, the home care composition according to any one of the fifty-first to sixty-second embodiments, wherein the ratio of laureth sulfate to the amine oxide is from about 2.5:1 to about 5:1.

According to a sixty-forth embodiment, the home care composition according to any one of the fiftieth to sixty-third embodiments, further comprising an inorganic salt selected from the group consisting of NaCl, $MgSO_4$, $Na_2SO_4$, $CaCl_2$, and a combination thereof.

According to a sixty-fifth embodiment, the home care composition according to the sixty-forth embodiment, wherein the inorganic salt is NaCl.

According to a sixty-sixth embodiment, the home care composition according to the sixty-forth or sixty-fifth embodiment, wherein the inorganic salt is present in an amount of from about 1.0% to about 5.0% by weight of the composition.

According to a sixty-seventh embodiment, the home care composition according to any one of the fiftieth to sixty-sixth embodiments, further comprising water.

According to a sixty-eighth embodiment, the home care composition according to the sixty-seventh embodiment, wherein the water is present in an amount of from about 20.0% to about 32.0% by weight of the composition.

According to a sixty-ninth embodiment, the home care composition according to any one of the fiftieth to sixty-eighth embodiments, further comprising a hydrotrope.

According to a seventieth embodiment, the home care composition according to the sixty-ninth embodiment, wherein the hydrotrope is present in an amount of from about 0.1% to about 10.0% by weight of the composition.

According to a seventy-first embodiment, the home care composition according to any one of the fiftieth to seventieth embodiments, further comprising a chelator.

According to a seventy-second embodiment, the home care composition according to the seventy-first embodiment, wherein the chelator is EDTA.

According to a seventy-third embodiment, the home care composition according to the seventy-first or seventy-second embodiment, wherein the chelator is present in an amount of from about 0.1% to about 1.0% by weight of the composition.

According to a seventy-forth embodiment, the home care composition according to any one the fiftieth to seventy-third embodiments, wherein the composition appears clear after incubation at about 4 °C for about 6 hours.

According to a seventy-fifth embodiment, the home care composition according to any one of the fiftieth to seventy-forth embodiments, wherein the composition is free of turbidity after incubation at about 4 °C for about 6 hours.

According to a seventy-sixth embodiment, the home care composition according to any one of the fiftieth to seventy-fifth embodiments, wherein the viscosity is about 400 cP to about 1450 cP as measured on a Brookfield RVT Viscometer using spindle 21 at 20 RPM at 25 °C when diluted with about 3 parts of water.

According to a seventy-seventh embodiment, provided is the use of a home care composition according to any one of the fiftieth to seventy-sixth embodiments, for cleaning an inanimate surface.

According to a seventy-eight embodiment, the use according to the seventy-seventh embodiment, wherein the inanimate surface is selected from: a dish; a utensil; and a countertop.

According to a seventy-ninth embodiment, provided is a method for cleaning a surface in a home comprising: applying an effective amount of a home care composition according to any one of the fiftieth to seventy-sixth embodiments, to said surface.

According to an eightieth embodiment, the method according to the seventy-ninth embodiment, wherein the surface is selected from: a dish; a utensil; and a countertop.

According to an eighty-first embodiment, provided is a home care composition comprising:

an ethoxylated sulfate having 1 moiety or less of an ethylene oxide group;

a hydrotrope;

an ethylene oxide/propylene oxide copolymer; and an amphoteric surfactant comprising a betaine.

According to an eighty-second embodiment, the home care composition according to the eighty-first embodiment, wherein the betaine is lauryl amido propyl betaine.

According to an eighty-third embodiment, the home care composition according to the eighty-first or eighty-second embodiments, wherein the pH of the composition is acidic.

According to an eighty-forth embodiment, the home care composition according to any one of the eighty-first to eighty-third embodiments, wherein the pH of the composition is from about 2.5 to about 4.0.

According to an eighty-fifth embodiment, the home care composition according to any one of the eighty-first to eighty-forth embodiments, wherein the ethoxylated sulfate is sodium laureth sulfate.

According to an eighty-sixth embodiment, the home care composition according to any one of the eighty-first to eighty-fifth embodiments, wherein the ethoxylated sulfate is present in an amount of from about 9% to about 38% by weight of the composition.

According to an eighty-seventh embodiment, the home care composition according to any one of the eighty-first to eighty-sixth embodiments, wherein the betaine is present in an amount of from about 2.5% to about 12% by weight of the composition.

According to an eighty-eighty embodiment, the home care composition according to any one of the eighty-first to eighty-seventh embodiments wherein the ratio of ethoxylated sulfate to the betaine is from about 2.5:1 to about 5:1.

According to an eighty-ninth embodiment, the home care composition according to any one of the eighty-first to eighty-eighth embodiments, further comprising an inorganic salt selected from the group consisting of NaCl, $MgSO_4$, $Na_2SO_4$, $CaCl_2$, and a combination thereof.

According to a ninetieth embodiment, the home care composition according to the eighty-ninth embodiment, wherein the inorganic salt is NaCl.

According to a ninety-first embodiment, the home care composition according to the eighty-ninth or ninetieth embodiment, wherein the inorganic salt is present in an amount of from about 1% to about 7.5% by weight of the composition.

According to a ninety-second embodiment, the home care composition according to any one of the eighty-first to ninety-first embodiments, further comprising NaOH.

According to a ninety-third embodiment, the home care composition according to the ninety-second embodiment, wherein the NaOH is present in an amount of from about 1% to about 5% by weight of the composition.

According to a ninety-forth embodiment, the home care composition according to according to any one of the eighty-first to ninety-third embodiments, further comprising formic acid, citric acid, lactic acid, benzoic acid, salicylic acid, capryl hydroxamic acid, or a combination thereof.

According to a ninety-fifth embodiment, the home care composition according to the ninety-forth embodiment, wherein the citric acid is present in an amount of from about 0.1% to about 5% by weight of the composition.

According to a ninety-sixth embodiment, the home care composition according to any one of the eighty-first to ninety-fifth embodiments, further comprising a chelator.

According to a ninety-seventh embodiment, the home care composition according to the ninety-sixth embodiment, wherein the chelator is tetrasodium N,N-bis(carboxymethyl)-L-glutamate.

According to a ninety-eight embodiment, the home care composition according to the ninety-sixth embodiment or ninety-seventh embodiment, wherein the chelator is present in an amount of from about 0.1% to about 1% by weight of the composition.

According to a ninety-ninth embodiment, the home care composition according to any one of the eighty-first to ninety-eighth embodiments, wherein the viscosity of the composition is about 400 cP to about 17450 cP as measured on a Brookfield RVT Viscometer using spindle 21 at 20 RPM at 25 °C when diluted with about 3 parts of water.

According to a hundredth embodiment, provided is a use of a home care composition according to any one of the eighty-first to ninety-ninth embodiments, for cleaning an inanimate surface.

According to a hundred-first embodiment, the use according to the hundredth embodiment, wherein the inanimate surface is selected from: a dish; a utensil; and a countertop.

According to a hundred-second embodiment, provided is a method for cleaning a surface in a home comprising: applying an effective amount of a home care composition according to any one of the eighty-first to ninety-ninth embodiments, to said surface.

According to a hundred-third embodiment, the method according to the hundred-second embodiment, wherein the surface is selected from: a dish; a utensil; and a countertop.

EXAMPLES

The examples and other implementations described herein are exemplary and not intended to be limiting in describing the full scope of compositions and methods of this disclosure. Equivalent changes, modifications and variations of specific implementations, materials, compositions, and methods may be made within the scope of the present disclosure, with substantially similar results.

Example 1

A concentrated wash liquid composition having the formulation as indicated in Table 2 was prepared. Under the conditions described, $SO_3$ LDDB sulphonic acid and caustic soda from the sodium hydroxide source are converted to sodium dodecylbenzenesulphonate (DDBS).

TABLE 2

| Ingredient | Composition 1 (wt. %) |
|---|---|
| Water | 20-40 |
| Sodium Laureth Sulfate 1EO (70%) (SLES) | 15-20 |
| $SO_3$ LDDB Sulphonic acid | 20-30 |
| Lauryl/Myristyl Amidopropyl Dimethylamine Oxide (33%) | 5-15 |
| NaOH (38% $Na_2O$) | 5-10 |
| $C_{9-11}$ Alcohol EO 7.5-8.1 | 0.5-3 |
| Sodium Chloride | 1-10 |
| Citric Acid | 0.1-1 |
| EDTA•$Na_4$ (62%) | 0.1-1 |
| Microbiocide | 0.1-1 |
| Perfume | 0.1-1 |
| Coloring | 0.01-0.1 |
| Total Components | 100.000 |

The composition concentrate shown within Table 2 was mixed with 3 parts water, mixed for about 30 seconds, and allowed to equilibrate at room temperature for about 10 minutes to provide for an active composition. The active composition yielded a viscosity of about 1375 cP @ 25 °C, 20 rpm, spindle 21. Achieving a viscosity of about 400 cP to about 1450 cP may be achieved by, for example, modifying the amount of water in the active composition. The color, odor, appearance, and viscosity of the active composition provided for beneficial characteristics. Thus, the concentrated wash liquid composition conveyed significant commercially appealing attributes.

Example 2

Characterization of low temperature stability and skin irritation. Variations of the composition of Table 2 were made utilizing various ethoxylated ingredient combinations as represented in Table 3, labeled as Compositions 2a through 2e. The compositions were incubated for 6 hours at 4 °C followed by analysis of the physical characteristics. The compositions 2a-2e were further analyzed for skin irritation.

TABLE 3

Concentrated dish wash liquid compositions.

| Ingredients | Comp. 2a | Comp. 2b | Comp. 2c | Comp. 2d | Comp. 2e | Visual Observations |
|---|---|---|---|---|---|---|
| SLES 0.2EO + $C_{9-11}$ Alcohol EO 7.5-8.1 | X | | | | | High turbidity |
| SLES 0.2EO | | X | | | | Moderate turbidity |
| SLES 0.45EO + NaDDBS | | | X | | | Clear, free of turbidity |
| SLES 1EO | | | | X | | Hazy |
| Sodium Lauryl Sulfate 0 EO (SLS) | | | | | X | High turbidity |

As shown in Table 3, compositions using both SLES 0.45EO and NaDDBS (Composition 2c) surprisingly and unexpectedly provided for stable and clear solutions at 4 °C. Furthermore, the composition compositions using both SLES 0.45EO and NaDDBS (Composition 2c) surprisingly and unexpectedly showed mild skin irritation with lower frequency of irritation reactions as compared to the other compositions.

Example 3

Optimization of concentrate surfactant formulations with respect to pH. Various compositions were prepared and analyzed for physical characteristics under various pH conditions. Specifically, compositions contained surfactant systems of either SLES and betaine or SLES and amine oxide at various ratios of about 3.5:1 SLES to betaine or amine oxide.

Use of SLES and amine oxide within acidic compositions (compositions having a pH of 5.5 or below) resulted in unwanted precipitation. However, this instability was not observed in neutral to alkaline compositions. In contrast, compositions containing SLES and betaine provided for stable compositions under acidic conditions.

Example 4

Optimization of concentrate surfactant formulations with use of hydrotropes. Preparation of pH neutral concentrate compositions having surfactant systems of SLES and betaine or SLES and amine oxide provided for gel compositions having viscosity above 500,000 cP using spindle 21 at 0.2 rpm at 25 °C. Such viscosity is not beneficial as processing the composition may not be attained at such thickness.

Surprisingly and unexpectedly, use of lactic acid (acting as a hydrotrope), in at least a 5.5% concentration, resulted in viscosity reduction to yield a fluid blend. Such beneficial effects were observed even at salt concentrations of about 3%.

Example 5

Preparation of an acidic concentrate. Compositions were prepared according to Table 4.

TABLE 4

| Ingredient | Wt. % |
|---|---|
| Water | 45-48 |
| SLES (1.0 EO) | 30-40 |

TABLE 4-continued

| Ingredient | Wt. % |
|---|---|
| N,N-Bis(carboxymethyl)-L-glutamic acid | 0.1-0.3 |
| Cocoamidopropyl betaine | 2.5-12.0 |
| EO/PO block coploymer | 0.15-0.4 |
| Fragrance | 0.5-1.5 |
| Salt | 2.5-4.0 |
| Colorant(s) | 0.01-1.0 |
| Organic Acid(s) | 5.5-7.0 |
| Ratio of SLES:Betaine | 3.5:1 |

The compositions were prepared by mixing together water and betaine, followed by mixing in a salt, organic acid(s), then other components which includes a non-ionic poloxamer surfactant, and followed by mixing in SLES. The pH was adjusted using either caustic soda or citric acid. The concentrated compositions typically had a viscosity of about 8200 cP (with a range of about 1,000 to about 30,000 cP) using spindle 21 at 0.2 rpm at 25 °C and pH of 2.5 to 3.5. When the concentrate was diluted 1:3 with water, the diluted composition typically had a viscosity of about 1780 cP (with a range of 1,000 to 10,000 cP) using spindle 21 at 0.2 rpm at 25 °C and pH of 3.0 to 4.0.

Example 6 pH neutral concentrates were prepared and evaluated. The compositions were prepared having formulations that were the same as or similar to the formulation shown in Table 5. Such neutral compositions utilized the surfactant sodium dodecylbenzene sulfonate (NaDDBS), which was synthesized in situ from a reaction between sulfonic acid and caustic soda.

TABLE 5

| Ingredients | Wt. % |
|---|---|
| Water | 23-31 |
| SLES 70% (1EO) | 15-19 |
| Lauryl/myrsistylamidopropyl dimethylamine oxide 30% | 8-12 |
| DDB Sulphonic acid | 25-35 |
| Caustic soda | 6-10 |
| $C_{9-11}$ alcohol EO 7.5-8.1 | 1.5-2.0 |
| NaCl | 2-6 |
| Fragrance | 0.5-1.5 |
| Preservative | 0.2-0.5 |
| Chelant | 0.3-0.6 |
| Color | 0.3-0.6 |

Initially, concentrate compositions according to Table 5 but having high amounts of $C_{9-11}$ alcohol became a gel being too viscous for use. Replacing the $C_{9-11}$ alcohol with SLES resulted in a composition having appropriate viscosity for use. However, after one week of incubation, the composition produced unwanted separation and precipitation. Surprisingly and unexpectedly, compositions according to Table 5 using the $C_{9-11}$ alcohol at about 1.5 to about 2.0% provided for precipitate free compositions having appropriate viscosity. More so, preparation of the composition using water at about room temperature and maintaining the mixture at about 28-42 °C provided for compositions having useful viscosity, appearance, and stability.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. An aqueous liquid composition comprising:
from about 15 to about 20 wt. % of a laureth sulfate;
an alkyl aryl sulfonate comprising sodium dodecylbenzenesulphonate (DDBS) produced from about 20 to about 30 wt. % of $SO_3$ LDDB Sulphonic acid;
from about 0.5 to about 3 wt. % of a blend of non-ionic $C_{9-11}$ branched primary alcohols;
from about 1 to about 10 wt. % of an inorganic salt; and
from about 5 to about 15 wt. % of an amphoteric surfactant;
wherein the laureth sulfate has an average number of ethylene oxide group from 0.4 to 0.6; and
wherein all weight percentages are based on the total weight of the aqueous liquid composition.

2. The aqueous liquid composition according to claim 1 further comprising:
a hydrotrope; and
an ethylene oxide/propylene oxide copolymer.

3. The aqueous liquid composition according to claim 1, wherein the inorganic salt is selected from the group consisting of NaCl, MgSO4, Na2SO4, CaCl2, and a combination thereof.

4. The aqueous liquid composition according to claim 1, wherein the alkyl aryl sulfonate further comprises a $C_{8-14}$ linear alkyl aryl sulfonate other than sodium dodecylbenzenesulphonate (DDBS).

5. The aqueous liquid composition according to claim 1, wherein the alkyl aryl sulfonate further comprises tridecyl benzene sulfonate.

6. The aqueous liquid composition according to claim 1, wherein the blend of non-ionic $C_{9-11}$ branched primary alcohols has an average of about 7.4 to about 8.5 moles of ethylene oxide per mole of alcohol.

7. The aqueous liquid composition according to claim 1, wherein the amphoteric surfactant comprises a betaine surfactant, an amine oxide, or a combination of two or more thereof.

8. The aqueous liquid composition according to claim 7, wherein the betaine surfactant is selected from cocamidopropyl betaine, lauryl amido propyl betaine, lauryl amino betaine acetate, and a mixture of two or more thereof.

9. The aqueous liquid composition according to claim 1, wherein the aqueous liquid composition has a weight ratio of the total amount of laureth sulfate surfactant and alkyl aryl sulfonate to the total amount of amine oxide of from about 8:1 to about 19:1.

10. The aqueous liquid composition according to claim 1, wherein the aqueous liquid composition has a total amount of laureth sulfate surfactant and alkyl aryl sulfonate to the total amount of betaine amphoteric surfactant of from about 8:1 to about 19:1.

11. An aqueous liquid composition comprising:
from about 9 to about 38 wt. % of a laureth sulfate;
from about 9 to about 48 wt. % of sodium dodecylbenzenesulphonate (DDBS) produced from about 20 to about 30 wt. % of $SO_3$ LDDB Sulphonic acid;
from about 1 to about 7 wt. % of a blend of non-ionic $C_{9-11}$ branched primary alcohols; and
from about 2.5 to about 12 wt. % an amphoteric surfactant, wherein all weight percentages are based on the total weight of the aqueous liquid composition; and wherein the laureth sulfate has an average number of ethylene oxide group from 0.4 to 0.6.

12. The aqueous liquid composition according to claim 11 further comprising:

from about 0.1 to about 10 wt. % a hydrotrope; and from about 0.1 to about 1 wt. % of an ethylene oxide/propylene oxide copolymer.

13. The aqueous liquid composition according to claim 11 further comprising:

from about 1 to about 5 wt. % of an inorganic salt selected from the group consisting of NaCl, MgSO4, Na2SO4, CaCl2, and a combination thereof.

14. The aqueous liquid composition according to claim 11, wherein the aqueous liquid composition has a pH from about 2.5 to about 8.

15. The aqueous liquid composition according to claim 12, wherein the hydrotrope is selected from formic acid, citric acid, lactic acid, benzoic acid, salicylic acid, capryl-hydroxamic acid, and a combinations of two or more thereof.

16. The aqueous liquid composition according to claim 11, wherein the amphoteric surfactant comprises an amine oxide surfactant, a betaine surfactant, or a combination of two or more thereof.

17. The aqueous liquid composition according to claim 11, wherein the aqueous liquid composition is free of turbidity after incubation at 4 °C for 6 hours.

* * * * *